United States Patent [19]
Poignant

[11] Patent Number: 6,094,886
[45] Date of Patent: Aug. 1, 2000

[54] METHOD OF MANUFACTURING A FLAT CONTAINER FOR SAMPLES

[75] Inventor: Michel Poignant, Neuilly, France

[73] Assignee: Cosmetic Advertising Promotion Investments, Inc., New York, N.Y.

[21] Appl. No.: 09/092,801

[22] Filed: Jun. 5, 1998

[51] Int. Cl.[7] ............................... B65B 3/02; B65B 47/08
[52] U.S. Cl. ............................. 53/412; 53/133.8; 53/453; 53/561; 206/532; 206/820; 206/823; 264/524
[58] Field of Search ............................... 53/561, 560, 559, 53/454, 453, 412, 133.8, 133.1; 206/823, 820, 532; 264/524

[56] References Cited

U.S. PATENT DOCUMENTS

| | | | |
|---|---|---|---|
| 2,991,500 | 7/1961 | Hagen | 53/454 X |
| 3,251,915 | 5/1966 | Pechthold | 53/561 X |
| 3,519,705 | 7/1970 | Pannenbecker | 53/561 X |
| 4,056,914 | 11/1977 | Mnilk et al. | 53/561 X |
| 4,342,184 | 8/1982 | Van Eck et al. | 53/561 X |
| 4,596,110 | 6/1986 | Weiler | 53/410 |
| 4,967,539 | 11/1990 | Hansen | 53/561 X |

FOREIGN PATENT DOCUMENTS

| | | |
|---|---|---|
| 0 280455 | 8/1988 | European Pat. Off. . |
| 1 329 029 | 12/1963 | France . |
| 1329029 | 12/1963 | France . |
| WO97 49611 | 12/1997 | WIPO . |

OTHER PUBLICATIONS

French Search Report, Feb. 22, 1999.

*Primary Examiner*—James F. Coan
*Attorney, Agent, or Firm*—Young & Basile

[57] ABSTRACT

A mold is formed the interior volume of which corresponds to the exterior envelope required for the container (2). A core corresponding to the shape required for the cavity (14) to be formed inside the container (2) is prepared. Said core is placed inside the interior volume of the mold and an appropriate plastics material is injected under pressure into said interior volume to constitute an envelope comprising two substantially parallel walls (5, 6) extending at a predetermined small distance from each other between two common lateral edges (9, 10), with a common transverse edge (16) at the same end as the neck (14b). The product to be packaged is injected into the interior of the envelope. The transverse edge (15) of the body (14a) is closed by welding the plastics material.

12 Claims, 1 Drawing Sheet

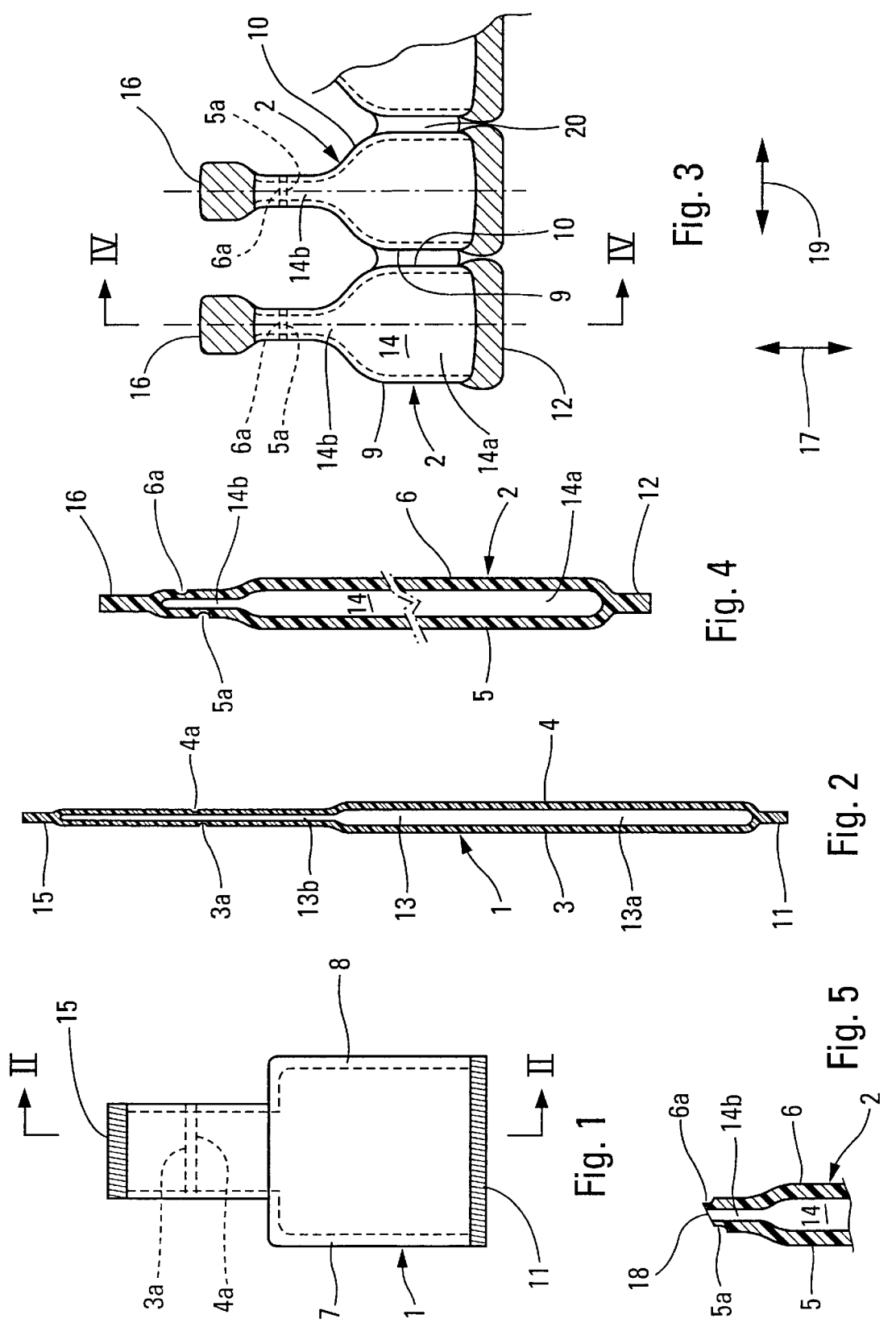

METHOD OF MANUFACTURING A FLAT CONTAINER FOR SAMPLES

The present invention concerns a method of manufacturing a substantially bottle-shaped flat container adapted to contain a small volume sample of a substantially liquid product, in particular a product based on a solvent or alcohol such as a cosmetic product.

The present invention also concerns a flat container of the above type manufactured by the method of the invention.

The substantially liquid products for which manufacturers require a container adapted to contain a small volume, for example less than 1 cm$^3$, sample of said product are costly products in the fields of cosmetics, perfumery, pharmacy or parapharmacy.

Liquid cosmetic products are often solvent-based and often have a color that is an important factor and must be made visible, as with nail varnish, for example.

The perfume industry requires such containers for perfumes and toilet waters which are generally alcohol-based and also have a pleasant color that it is important to show.

Pharmaceutical products are products for external use, for example, and are generally alcohol-based. Their color is usually not of much importance.

Tubular packaging adapted to contain all sorts of more or less fluid pastes for food, cosmetic or sanitary use can be made by extrusion. Such packaging, even if small in size, is generally too thick when filled to be used for a product sample adapted to be inserted into a widely circulated medium, for example a magazine or journal.

Pouches adapted to contain a sample of a creamy consistency product, for example a cream for cosmetic use or a sauce for use in cooking, are also known in themselves. These pouches are relatively flat and consist either of a tubular envelope successive sections of which are sealed at both transverse ends after introducing the product to be packaged or have two substantially rectangular walls fastened together by sealed peripheral closure means, for example by welding or gluing.

These pouches are not able to resist high pressures, however, for example those encountered when magazines or reviews are stacked for storage or transportation. Also, the walls of these pouches are generally opaque.

Such tubular shape packages and substantially rectangular flat pouches are not adapted to contain a substantially liquid product usually sold in a three-dimensional flask preferably having a customized shape which is important both to the manufacturer and to the consumer of the product concerned.

Finally, inserting flat samples into journals or magazines addresses a much more specifically targeted clientele than other means of communication and there is therefore a real need for a method of the above type enabling a flat container of the above type to be circulated inside a magazine or journal.

The method of the invention comprises the steps of preparing two walls joined together by their respective longitudinal edges, closing a first transverse edge, injecting the product to be packaged into the cavity thus formed and then closing the second transverse edge.

In accordance with the invention, the method is characterized in that it includes the following steps:

two half-shells are prepared which are adapted to be pressed together to form a mold for injection molding the interior volume of which is shaped to form the outer envelope required for said container;

a core is prepared corresponding to the shape required for the cavity to be formed inside the container, the cavity having a body part communicating with a neck part of smaller size in the transverse direction;

said core is placed in the interior volume of said mold and an appropriate plastics material is injected under pressure into the interior volume of said mold to constitute an envelope comprising two substantially parallel walls extending at a predetermined small distance from each other between two common lateral edges, with a common transverse edge at the same end as the neck;

the product to be packaged is injected into the interior of the envelope; and the transverse edge of the body is closed by welding the plastics material.

The plastics material is preferably an ethylene and vinyl acetate copolymer (EVA).

In this way it is possible to manufacture a flat container adapted to contain a small volume sample of a substantially liquid product, possibly a highly aggressive product, for example a solvent-based product such as a cosmetic product, or an alcohol-based product, such as a perfume or a pharmaceutical product, the container being able to resist high pressures as encountered in stacks of magazines or journals, for example.

EVA copolymer is transparent and shows the color of the sample of product contained in the container.

Other features and advantages of the present invention will become apparent in the following detailed description:

In the accompanying drawings, given by way of non-limiting example only:

FIG. 1 is a top view of a first embodiment of a container produced by the method of the present invention;

FIG. 2 is a view to a larger scale in section taken along the line II—II in FIG. 1;

FIG. 3 is a view similar to FIG. 1 of another embodiment of the present invention;

FIG. 4 is a view to a larger scale in section taken along the line IV—IV in FIG. 3; and FIG. 5 is a view of a detail from FIG. 4 after breaking the neck.

The method of the present invention is a method of manufacturing a substantially bottle-shaped flat container 1, 2 adapted to contain a small volume sample of a substantially liquid product such as a cosmetic product.

Examples of such bottles are shown diagrammatically in FIGS. 1 through 5.

The method comprises the steps of preparing two walls 3, 4, 5, 6 joined together at their respective longitudinal edges 7, 8, 9, 10, closing a first transverse edge 11, 12, injecting the product to be packaged into the cavity 13, 14 thus formed and then closing the second transverse edge 15, 16.

In accordance with the present invention, the method is characterized in that it includes the following steps:

two half-shells are prepared which are adapted to be pressed together to form a mold the interior volume of which is shaped to form the outer envelope required for said container 1, 2;

a flat, blade-like core is prepared corresponding to the shape required for the cavity 13, 14 to be formed inside the container 1, 2, the cavity 13, 14 having a body part 13a, 14a communicating with a neck part 13b, 14b of smaller size in the transverse direction;

said core is placed in the interior volume of the mold and an appropriate plastics material is injected under pressure into the interior volume of said mold to constitute an envelope comprising two substantially parallel walls 3, 4, 5, 6 extending at a predetermined small distance from each other between two common lateral edges 7, 8, 9, 10, with a common closed transverse edge 15, 16 at the same end as the neck 13b, 14b;

the product to be packaged is injected into the interior of the envelope; and the other transverse edge 11, 12 of the body 13a, 14a is closed by welding the plastics material, for example by an ultrasound welding process.

A plastics material that can be pressure injection molded and welded to form a sealed weld resistant to pressure must of course be used.

In the examples represented there is on each wall 3, 4, 5, 6 of the container 1, 2, at the neck 13b, 14b, a thinner transverse line 3a, 4a, 5a, 6a forming a break line for opening said container 1, 2.

In the example represented in FIGS. 3, 4 and 5 the thinner transverse line 5a on the wall 5 of the container 2 is slightly offset in the longitudinal direction 17 relative to the other lines 6a so that after breaking it along said offset lines 5a, 6a an opening 18 is formed with edges offset in a bevel-like manner to form an applicator.

In this example of the invention, a mold is prepared having at least two adjacent cavities in the transverse direction 19, each for molding one container 2, the two cavities communicating with each other via a thin opening adapted to form after molding a rib 20 joining the corresponding two adjacent containers 2 at their respective lateral edge.

The plastics material employed is preferably an ethylene and vinyl acetate copolymer (EVA), in particular PA-538, PA-539, or PA-540® copolymer. These three types of copolymer have excellent flexibility, transparency and strength characteristics and are particularly well suited to pressure injection molding and to welding. They are also resistant to solvents and to alcohol. They are therefore perfectly suited to the manufacture of containers for samples of colored and aggressive products such as nail varnish or perfume and the like.

Of course, the present invention is not limited to the embodiments described hereinabove and many changes and modifications can be made to the latter without departing from the scope of the invention.

What is claimed is:

1. A method of manufacturing a substantially bottle-shaped flat container (1, 2) adapted to contain a small volume sample of a substantially liquid product, the method comprising the step of preparing two walls (1, 2, 3, 4) joined together at their respective longitudinal edges (5, 6, 7, 8), closing a first transverse edge (11, 12), injecting the product to be conditioned into the cavity (13, 14) thus formed, and then closing the second transverse edge (15, 16), characterized in that said method includes the following steps:

two half-shells are prepared which are adapted to be pressed together to form a mold the interior volume of which is shaped to form the outer envelope required for said container (1, 2);

a core is prepared corresponding to the shape required for the cavity (13, 14) to be formed inside the container (1, 2), the cavity (13, 14) having a body part (13a, 14a) communicating with a neck part (13b, 14b) of smaller size in the transverse direction;

said core is placed in the interior volume of said mold and an appropriate plastics material is injected under pressure into said interior volume to constitute an envelope comprising two substantially parallel walls (3, 4; 5, 6) extending at a predetermined small distance from each other between two common lateral edges (7, 8; 9, 10), with a common transverse edge (15, 16) at the same end as the neck (13b, 14b);

the product to be packaged is injected into the interior of the envelope;

the transverse edge (11, 12) of the body (13a, 14a) is closed by welding the plastics material; and, further characterized in that a thinner transverse line (3a, 4a; 5a, 6a) is formed in each wall (3, 4; 5, 6) of the container (1, 2) at the level of the neck (13a, 14a) to form a break line for opening said container.

2. A method according to claim 1 characterized in that the plastics material employed is an ethylene and vinyl acetate copolymer.

3. A method according to claim 1 characterized in that the thinner transverse line (5a) on one wall (5) is slightly offset in the longitudinal direction (17) relative to the other line (6a) so that after breakage along said offset lines (5a, 6a) an opening (18) is formed with edges offset in a bevel-like manner to form an applicator.

4. A method according to claim 1 characterized in that the common transverse edge (16) at the same end as the neck (14b) has a greater transverse dimension to form a holding area (16) after welding.

5. A method according to any one of the preceding claims characterized in that a mold is prepared having at least two interior volumes adjacent in the transverse direction each adapted to mold one container (2), the two interior volumes communicating with each other via a thin opening adapted to form after opening a rib (20) joining the corresponding two adjacent containers (2) at their respective lateral edge (10, 9).

6. A substantially bottle-shaped flat container (1, 2) adapted to contain a small volume sample of a substantially liquid product, comprising two substantially parallel walls extending at a predetermined small distance from each other between two common lateral edges and a common transverse edge, said walls defining an internal cavity having a body part communicating with a neck part of smaller size in the transverse direction, said common transverse edge being arranged at an end of said neck part, said container being adapted to be manufactured by injection moulding under pressure of an appropriate plastics material and to contain a substantially liquid product injected into said cavity through a transverse edge of said body part, whereafter said body part transverse edge is closed by welding the plastics material, wherein a thinner transverse line is formed in each wall of the container at the level of the neck to form a break line for opening said container.

7. The substantially bottle-shaped flat container of claim 6, wherein the plastics material employed is suitable for containing a solvent-based cosmetic product.

8. The substantially bottle-shaped flat container of claim 6, wherein the thinner transverse line on one wall is slightly offset in the longitudinal direction relative to the other line so that after breakage along said offset lines an opening is formed with edges offset in a bevel-like manner to form an applicator.

9. The substantially bottle-shaped flat container of claim 6, wherein the common transverse edge at the same end as the neck has a greater transverse dimension to form a holding area after welding.

10. A substantially bottle-shaped flat container according to any one of claims 7 through 9, wherein two such containers are joined at their respective lateral edges by a rib.

11. The substantially bottle-shaped flat container of claim 6, wherein the plastics material employed is an ethylene and vinyl acetate copolymer.

12. The substantially bottle-shaped flat container of claim 7, wherein the container is adapted to contain a small volume of a solvent-based cosmetic product.

* * * * *